W. B. FENN.
MACHINE FOR CUTTING GREEN CORN FROM THE COB.
APPLICATION FILED FEB. 2, 1916.

1,282,792.

Patented Oct. 29, 1918.
4 SHEETS—SHEET 2.

W. B. FENN.
MACHINE FOR CUTTING GREEN CORN FROM THE COB.
APPLICATION FILED FEB. 2, 1916.

1,282,792.

Patented Oct. 29, 1918.
4 SHEETS—SHEET 4.

Inventor
William B. Fenn
By Edwin P. Carter
Attorney

UNITED STATES PATENT OFFICE.

WILLIAM B. FENN, OF COLUMBUS, OHIO, ASSIGNOR TO THE WEDOIT COMPANY, OF COLUMBUS, OHIO.

MACHINE FOR CUTTING GREEN CORN FROM THE COB.

1,282,792.

Specification of Letters Patent.

Patented Oct. 29, 1918.

Application filed February 2, 1916. Serial No. 75,811.

*To all whom it may concern:*

Be it known that I, WILLIAM B. FENN, a citizen of the United States of America, residing at Columbus, in the county of Franklin and State of Ohio, have invented certain new and useful Improvements in Machines for Cutting Green Corn from the Cob, of which the following is a specification.

My invention relates to machines for cutting green corn from the cob and has particular reference to that class of machines wherein the ears of corn are successively presented to a relatively rotatable knife structure which severs the kernels and permits the cobs to pass on through the machine.

In machines of this type the standard of commercial practicability demands that the cutting action be performed with considerable rapidity and experience indicates that the relative rotation of the knives and the ears of corn must be between 400 and 700 revolutions per minute. It is unnecessary to point out the very obvious fact that the torsional stresses are great and must inevitably menace the success of these machines in continuous operation.

This invention is primarily directed to minimizing the dangers to successful operation, many of which dangers are directly due to the torsional stresses and other stresses arising in the operation of these machines at the rates of speed indicated. It is probable that the most dangerous part of the cutting operation is at the moment of the initiation of the cutting action, that is, when the ear of corn is first moved into actual subjection to the cutting knives which are revolving at such a high rate of speed. It will be appreciated that very slight deviations of structure or operation may become of utmost importance in machines of this type and that this is particularly true at the initiation of the cutting action, although dangers of equal or almost equal magnitude may arise as the cutting action progresses.

The nature of the dangers will more clearly appear from a description of the improved features comprising this invention. This description will be given in conjunction with certain drawings forming a part of this application wherein similar characters of reference designate corresponding parts, and wherein.

Figure 1:
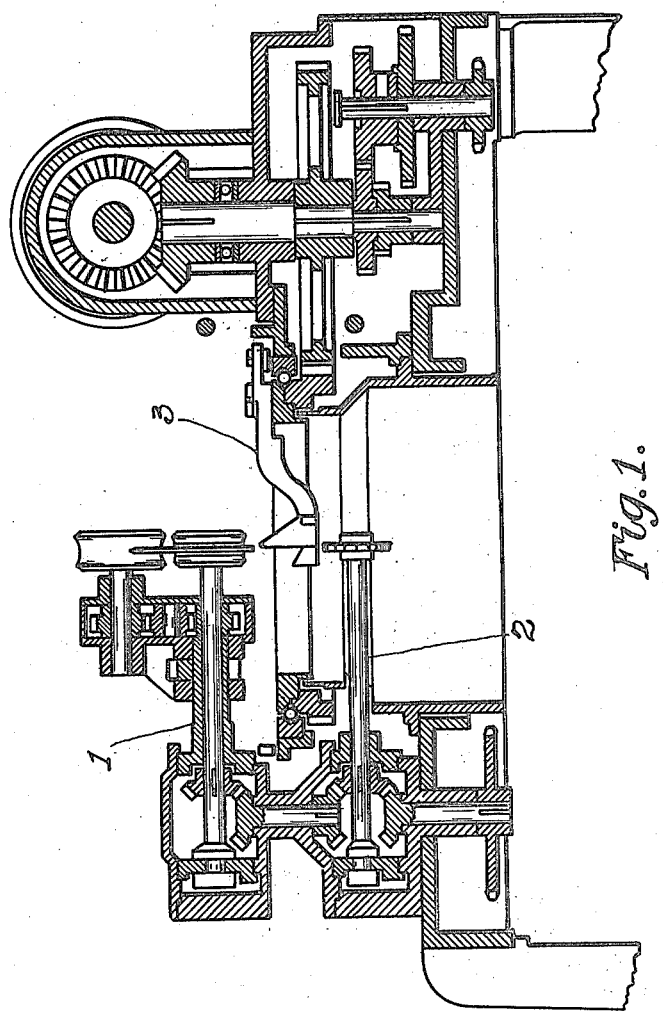
Figure 1 is a vertical section generally illustrating the nature of the machine to which my improvements are applied.

In the drawings the machine is shown as comprising upper feed roller mechanism which may be generally designated 1, lower feed roller mechanism which may be designated 2 and intermediate knife structure indicated by the numeral 3. The upper feed roller mechanism is preferably comprised of three pairs of feed rollers, the units of which pairs are superposed and which are disposed radially and yieldably in such relation that they serve as a funnel structure to receive and feed the ears of corn.

Immediately beneath these upper feed rollers are the revolubly mounted knives which are preferably three in number and which are carried in their revolution by knife arms pivoted to a rotating ring element. Attention is directed to the close relation of the points of the cutter knives to the vertical blades of the upper feed rollers. Between these points and the lower points of the vertical blades, there is preferably no greater clearance than one-eighth of an inch.

Just below the revolving knives are the lower feed rollers which are preferably three in number and radially and yieldably disposed.

Many of the details of the machine as a whole have been omitted because it is primarily desired to illustrate the general type of machine (Fig. 1) to which the improved features illustrated in Figs. 2 to 9 inclusive have been applied. From the description thus far given it will be apparent that the features of this invention are primarily applicable to a machine for cutting green corn from the cob wherein the kernels are removed by a spiral cutting action. It will be further apparent that the ears of corn are fed by yieldable feed rollers to a rotatable knife structure wherein the knives are yieldable along substantially radial lines, and that other yieldable feed rollers grip and feed the cob after the kernals have been removed.

Figure 2:
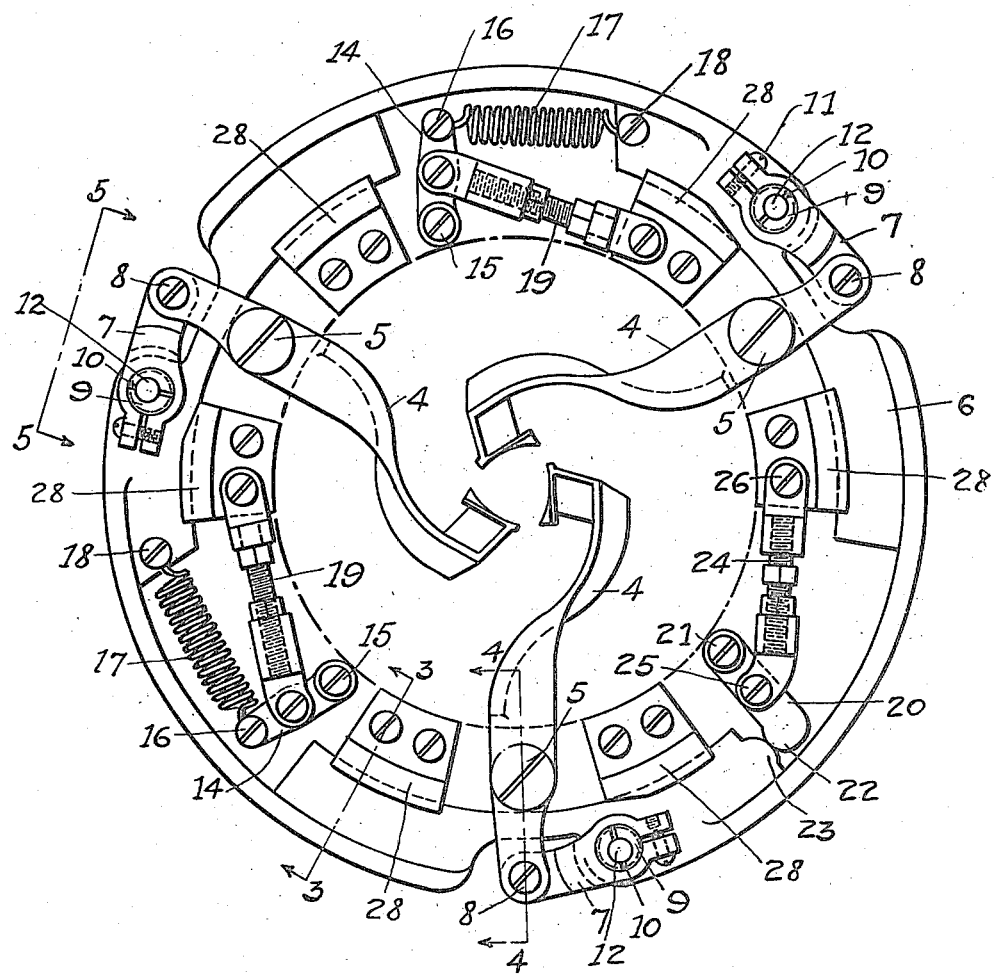
Fig. 2 is a plan view of an improved knife structure forming a part of the machine shown in Fig. 1.

The knife structure of Fig. 2 embodies the first features of improvement forming a part of this invention and one of these features has to do with the manner of tying the knife arms 4. These knife arms are fulcrumed at 5 and it is aimed to connect their outer extremities to a ring 6 which ring 6 is rotatably and automatically adjustable with relation to the rotatable knife structure to cause the knife arms 4 to vary their positions simultaneously and equally. This automatic adjustment takes place in response to the constantly varying contours of the cobs and under the restraint of a resilient connection between the knife structure and the controlling ring for the knife arms.

In connecting the outer extremities of the knife arms to the ring 6 I have found it extremely desirable to accomplish two things. One is to produce a simple adjustment to vary the relative positions of the knife arms so as to set them in proper relation at any time. The other is to provide a tying device which will wear uniformly so that dangers from lost motion will not arise from continuous use of the machine.

The tying mechanism utilized comprises a link 7 pivoted at 8 to the outer extremity of the knife arm and split as well as bored at its other end to embrace an eccentric 9. This eccentric 9 is grooved at 10 so that it may be rotated partially to vary the effective length of the link 7. The split end of the link 7 may have its legs adjustable to grip eccentric 9 by a controlling screw 11. It will appear that the wearing action is upon pins 12 and 8, the pin 12 also constituting the support for the eccentric 9. The uniformity of the wear of these points is particularly notable in comparison with the customary pin and slot connection which this improvement supersedes.

A further improvement of this knife structure has relation to the resilient connection between the ring which connects the knife arm and the body of the knife structure. It comprises a lever 14 fulcrumed at one end as at 15 and having its other end 16 connected to a retractile spring 17 which is also connected at 18 to the ring 6. The lever 14 is braced intermediate its ends by a longitudinally adjustable member 19 comprising a sleeve pivoted to such lever and internally threaded for the adjustable reception of a threaded bolt. This threaded bolt carries stop nuts and its opposite end is cylindrical and smooth so as to be rotatable in a bored sleeve pivoted to a part of the rotatable knife structure and in which it fits. The result is that the spring which exerts a pull upon the ring 6 so as to yieldingly restrain the spreading of the knife arms is operating practically in concentric lines with the moving ring. A more delicate and consequently more desirable resistance is offered to the spreading of the knife arms as the comparatively soft ears of corn of varying contours pass therethrough. The adjustable brace 19 makes it possible to vary the tension of any spring.

Adapting the idea of this spring construction, I have constructed a somewhat similar stop mechanism for limiting the movement of the knives toward each other. This stop mechanism comprises a lever 20 fulcrumed at 21 and having a rounded end 22. The fulcrum is on the main portion of the knife structure and the rounded end 22 is designed to abut a rounded portion 23 on the ring 6. This stop mechanism is variable by the adjustment of a brace 24 connected at 25 to the lever 20 and at 26 to the body of the knife structure. A right and left hand screw forms a part of this brace and renders it readily adjustable.

Figure 3:
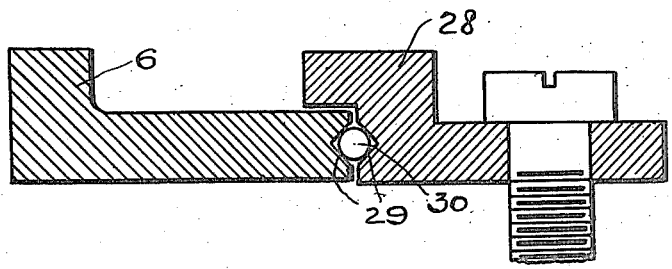
Fig. 3 is a section taken on line 3—3 of Fig. 2.

In dealing with a product such as green corn, the comparative softness of the article upon which the work is to be performed must be taken into consideration. This is particularly true when this comparatively soft article is subjected to a spiral cutting action by knives which have a relative rotation of 400 or more revolutions per minute. Little argument is necessary to prove that minute structural differences many times produce very considerable differences in the result attained. There is one feature of the present invention which, though not minute, is more or less known in other arts and that is the mounting of the swinging knife arms and their controlling ring on ball-bearings. This is illustrated best in Figs. 3 and 4. In the fragmentary section in Fig. 3 is shown the mounting of the controlling ring and it will appear that this is embraced by a flange 28. The abutting vertical edges of this ring and the flange are provided with rectangular ball races 29 for the reception of ball-bearings 30. The result is that the knife structure is rotatable on the frame-work of the machine without any material contact of flat surfaces.

Figure 4:
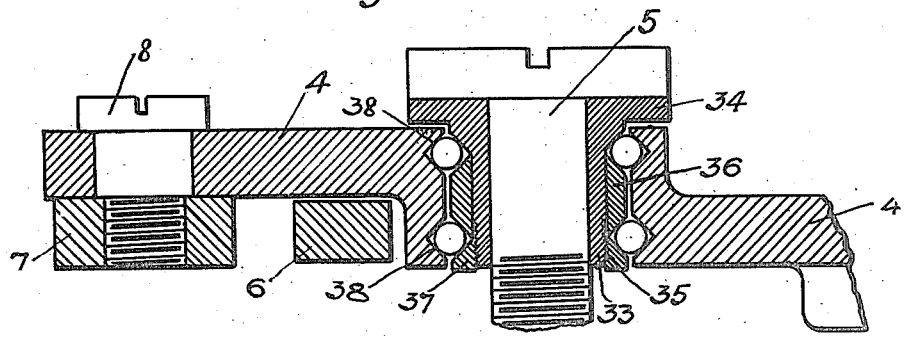
Fig. 4 is a section taken on line 4—4 of Fig. 2.
Figure 5:
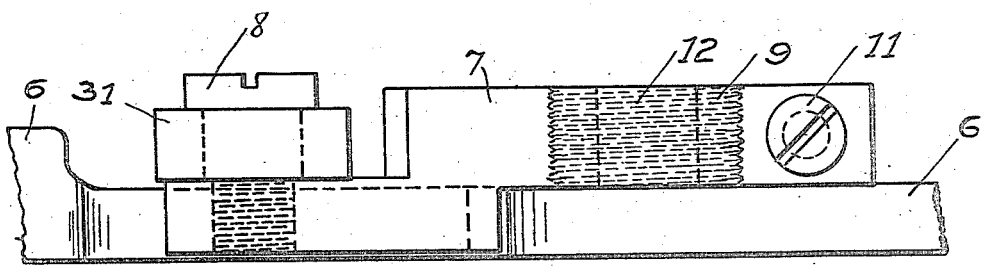
Fig. 5 is a side elevation of the adjustable knife arm connection indicated by the bracket 5—5 on Fig. 2.

A still more notable portion of this invention is the supporting structure for each knife arm, illustrated in Fig. 4. The advantage of this structure is that it not only prevents friction and wear but it may be applied and removed as a unit, which unit comprises the knife arm 34 fulcrumed upon the bolt 35 and having as a normally inseparable part thereof a sleeve 33 flanged as at 34 and threaded as at 35. Complementally fitting on this sleeve is a beveled ring 36 and this ring is ultimately held in place through the medium of ball-bearings yet to be described by a second ring 37 internally threaded to screw upon the threads 35 of the sleeve 33. A further detailed description of these parts would probably tend to confuse and so it will be noted by reference to Fig. 4 that the bore in the knife arm, the sleeve 33 and the rings 36 and 37 have their surfaces so formed that they provide superposed angular raceways for ball-bearings 38. The value of this structure is greatly enhanced by the fact that the ball-bearings are really a part of the knife arm and the advantages resulting in assembling or taking apart the machine are very obvious.

Figure 7:
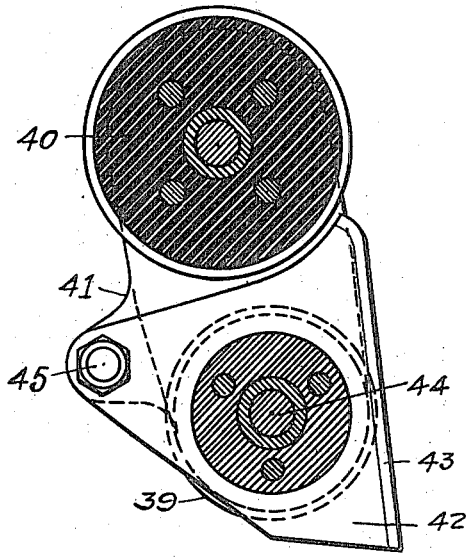
Fig. 7 is a section taken on line 7—7 of Fig. 6 and indicating the peculiar form of vertical blade forming a part of my invention.
Figure 6:
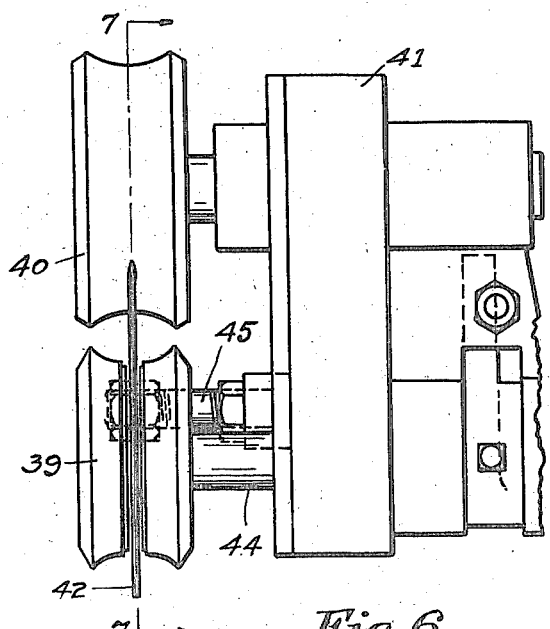
Fig. 6 is a detail in side elevation of the upper feed roller structure of my machine.

In Figs. 6 and 7 and in Fig. 1 there appears a very vital feature of my invention. Generically stated I believe that I am the first to provide, in combination with means for feeding the ears of corn to the cutting knives initially, a non-feeding means which is supplemental thereto and which bites into the ears. In these figures, the feeding means are shown as rubber rollers 39 and 40 disposed one above the other and geared together by gears mounted within the housing 41. As shown in Fig. 1 the gears are so constructed that the speeds of travel of the peripheries of the rollers 39 and 40 are the same. It is important to note that the rollers 40 are of a greater diameter than the rollers 39 therebeneath and that the feeding sides of the upper rollers 40 are slightly in the rear of the feeding sides of the lower rollers 39. Furthermore, the peripheries of these rollers are concave. The result is that when three or more of these pairs of rollers are assembled and operated, they serve as a funnel whose surfaces are constantly exerting a downward frictional pull on the ears of corn while tending to preclude escape between the pairs by their concave surfaces.

The use of upper rollers which are large in comparison with the rollers immediately above the cutter knives is peculiarly desirable. It makes possible the use of much smaller rollers immediately above the knives than have hitherto been used, with the result that the ears are supported nearer to the points of stress. It is extremely desirable to have the smallest practicable rollers immediately above and immediately below so that short ears may be effectively handled by the machine.

The upper rollers, however, should be as large as practicable for this facilitates entering and feeding of the ears by the better tangential relations of the feeding surfaces and the surfaces of the ears.

One other feature of note in the construction shown arises from the fact that the feed rollers are of soft rubber so that they are in some measure conformable to the irregular surfaces of the ears. A more effective gripping action must result from this. Again, this compressibility of the feed rollers further enhances the desirability of large upper feed rollers because the larger a roller is when it is compressible, the larger will be its effective surface.

Regardless of the type of feeding elements used, I find it practically essential to use a supplemental non-feeding element preferably in the form of a vertical blade 42 which is peculiarly shaped to provide an elongated cutting edge 43 desirably designed to extend downward to within one-eighth of an inch of the rotating cutters and well up beyond the lowermost point in the periphery of the upper rollers. These blades have several functions. They prevent turning of the ears of corn when they are subjected to the torsional stress of the cutting knives. They brace the ears of corn and are particularly effective because they bite through the kernels and into the cob being probably most effective at the initiation of the cutting actions when they brace the springy ends of the ears. They aid in preventing twisting of the ears into the spaces between the radially disposed pairs of feed rollers.

The vertical blades 42 are yieldable with the upper rollers 40 which are mounted to yield outwardly with the upper portions of the casings 41 which are pivoted upon shafts 44. These blades 42 are carried in the center of the split lower feed rollers 39 and they are bolted to the casings 41 by bolt 45. They are held rigid independently of these split feed rollers and sufficient clearance exists to prevent material disturbance of one by the other. The result is an elongated knife blade which conforms to the varying shapes of the ears of corn just as do the feed roller pairs.

Figure 9:
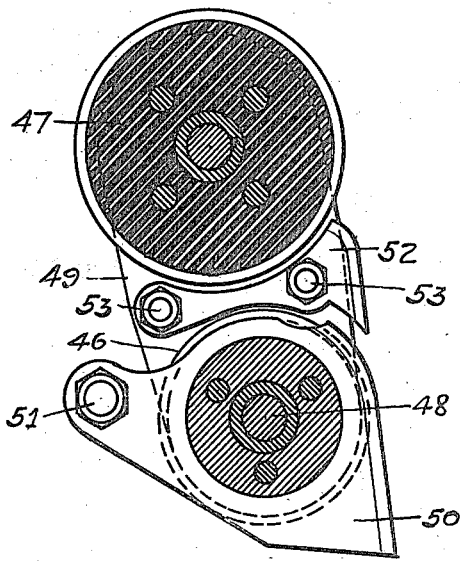
Fig. 9 is a section taken on line 9—9 of Fig. 8, indicating the modified blade more clearly.
Figure 8:
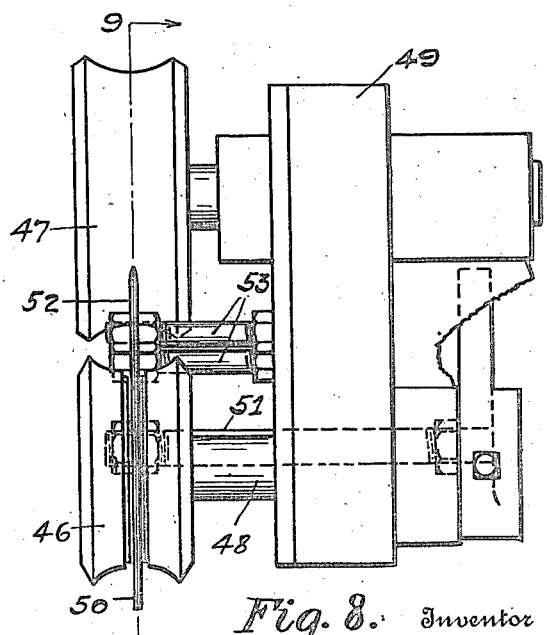
Fig. 8 is a detail of the modified upper feed roller structure, varying chiefly in the form of blade used.

A modified form of blade structure is illustrated in Figs. 8 and 9 wherein there are lower feed rollers 46 and upper rollers 47 geared together and pivotally mounted upon shafts 48 by means of gear casings 49. The vertical blades in this structure are each formed in two parts which, when assembled, are practically identical in general contour with the single-piece blades 42. They comprise a lower blade 50 bolted as at 51 to an immovable element and an upper blade 52 bolted as at 53 in the casing 49. The result is that the lower blades are stationary while the upper blades are yieldable. With certain types and classes of corn this latter form of blades is desirable for the upper part of the blade can yield without throwing the lower point of the blade into obstructive position or into interference with the feeding of the ears. Danger of splitting the ears is also decreased.

I have endeavored to outline the principal and novel functions of my invention. Many other functions may appear and various modifications may be feasible without departing from the principles illustrated.

Having thus described my invention, what I claim is:

1. In a machine for cutting green corn from the cob, cutter knives, feeding elements for feeding the ears through said cutter knives, and pivotally mounted blades adjacent said feeding elements and designed to bite into and brace the ears of corn during feeding.

2. In a machine for cutting green corn from the cob, cutter knives, feeding elements for feeding the ears through said cutter knives, and blades adjacent said feeding elements and designed to bite into and brace the ears of corn during feeding, said blades being yieldable about a pivot.

3. In a machine for cutting green corn from the cob, cutter knives, feeding elements yieldable about a pivot for feeding the ears through said cutter knives, and biting blades adjacent said feeding elements and yieldable about a pivot and mounted to bite into and brace the ears of corn during feeding.

4. In a machine for cutting green corn from the cob, cutter knives, feeding elements for feeding the ears through said cutter knives, and bracing blades so mounted that they are adjacent to but free from material lateral contact with said feeding elements.

5. In a machine for cutting green corn from the cob, cutter knives, feeding elements for feeding the ears through said cutter knives comprising spaced pairs of superposed rollers, the rollers of each pair being of relatively different sizes.

6. In a machine for cutting green corn from the cob, cutter knives, and feeding elements for feeding the ears through said cutter knives comprising spaced pairs of superposed rollers, the upper rollers of each pair being larger than the lower rollers.

7. In a machine for cutting green corn from the cob, cutter knives, feeding elements for feeding the ears through said cutter knives and ear bracing blades adjacent said feeding elements and each formed in multiple parts.

8. In a machine for cutting green corn from the cob, cutter knives, feeding elements for feeding the ears through said cutter knives yieldable about pivots, a lower ear-bracing blade and a relatively tiltable ear-bracing upper blade, both being adjacent said feeding elements.

9. In a machine for cutting green corn from the cob, radially disposed cutter elements, a resiliently restrained ring, and a link connection between each of said cutter elements and said ring.

10. In a machine for cutting green corn from the cob, cutter elements, a resiliently restrained ring, means connecting said cutter elements to said ring, and means for adjusting said connection to vary the relative positions of said cutter elements.

11. In a machine for cutting green corn from the cob, cutter elements, a resiliently restrained ring, connections between said cutter elements and said ring, and an eccentric forming a part of said connections and adjustable to vary the effective length of said connections.

12. In a machine for cutting green corn from the cob, cutter elements, and a rotatable member carrying said cutter elements, a relatively rotatable ring connecting said cutter elements, a spring between said ring and said member, and a transversely extending lever connecting said spring to said member.

13. In a machine for cutting green corn from the cob, cutter elements, and a rotatable member carrying said cutter elements, a relatively rotatable ring connecting said cutter elements, a spring between said ring and said member, a transversely extending lever connecting said spring to said member, and an adjustable brace between said lever and said member.

14. In a machine for cutting green corn from the cob, cutter elements, a rotatable member for supporting said cutter elements, a relatively rotatable ring connecting said cutter elements, a transversely extending lever arm on said rotatable member and extending into position to form a stop for said ring.

15. In a machine for cutting green corn from the cob, cutter elements, a rotatable member for supporting said cutter elements, a relatively rotatable ring connecting said cutter elements, a transversely extending lever arm on said rotatable member and extending into position to form a stop for said ring, and means for adjusting the position of said stop.

16. In a machine for cutting green corn from the cob, cutter elements, a rotatable support for said cutter elements, a connecting ring for said cutter elements, and a ball-bearing support between said ring and said support.

17. In a machine for cutting green corn from the cob, cutter elements, a rotatable supporting member for said cutter elements, and a ball-bearing support between said cutter elements and said supporting member.

18. In a machine for cutting green corn from the cob, cutter elements, a supporting member for said cutter elements, and a ball-bearing support between said cutter elements and said supporting member, said support forming a part of and being removable with said cutter elements.

19. In a machine for cutting green corn from the cob by a spiral cutting action, cutter knives, feeding elements and ear-bracing blades adjacent said feeding elements and biting into the ears longitudinally, said blades being tiltable.

20. In a machine for cutting green corn from the cob by a spiral cutting action, cutter knives, feeding elements, and ear-bracing blades adjacent said feeding elements and biting into the ears longitudinally, said blades being yieldable and tiltable.

21. In a machine for cutting green corn from the cob by a spiral cutting action, cutter knives yieldable in an arcuate path, feeding elements for feeding the ears through said knives, and ball-bearing mountings for said cutter knives.

22. In a machine for cutting green corn from the cob by a spiral cutting action, cutter knives, a resiliently restrained ring joining said knives for feeding the ears through said knives, feeding elements, and a ball-bearing mounting for said ring.

23. In a machine for cutting green corn from the cob by a spiral cutting action, cutter knives, a resiliently restrained ring joining said knives, feeding elements for feeding the ears through said knives, and an adjustable device between each knife and the ring.

24. In a machine for cutting green corn from the cob, arcuately yieldable cutter elements, and a single restrained means effective to uniformly tension and position each of said cutter elements.

25. In a machine for cutting green corn from the cob, cutter elements arranged to swing about the periphery of the ears being cut, and means so connecting said elements that their movements are synchronous.

26. In a machine for cutting green corn from the cob, yieldable cutter elements, and a resiliently restrained means for connecting said elements whereby the swinging of one of said elements will uniformly increase the tension on all the elements.

27. In a machine for cutting green corn from the cob, cutter knives, feeding elements for feeding the ears to said cutter knives, and biting ear-bracing blades adjacent said feeding elements and tiltable to conform to the varying contours of the ears.

28. In a machine for cutting green corn from the cob, cutter knives, feeding elements for feeding the ears to said cutter knives, and biting ear-bracing blades adjacent said feeding elements and yieldable and tiltable to conform to the varying sizes and contours of the ears.

29. In a machine for cutting green corn from the cob, cutter knives, feeding elements comprising pairs of feed rollers relatively yieldable, and biting ear-bracing blades formed in two sections, one section being in fixed relation to each of said feed rollers.

30. In a machine for cutting green corn from the cob, cutter knives, feeding elements comprising pairs of feed rollers relatively yieldable for introducing the ears to said cutter knives, and biting ear-bracing blades constructed to correspondingly yield with each of said rollers.

31. In a machine for cutting green corn from the cob, cutter knives, feeding elements for feeding the ears through said cutter knives, and biting ear-bracing blades formed in multiple parts, said parts being relatively yieldable.

32. In a machine for cutting green corn from the cob, cutter knives, feeding elements comprising spaced pairs of relatively yieldable superposed rollers, and biting ear-bracing blades formed in multiple parts and yieldable with said feeding elements.

33. In a machine for cutting green corn from the cob, cutter knives, feeding elements comprising spaced pairs of superposed rollers for feeding the ears through said cutter knives, the rollers of each pair being relatively yieldable, and biting ear-bracing blades formed in multiple parts with one part for each of said rollers.

34. In a machine for cutting green corn from the cob, cutter knives, feeding elements for feeding the ears through said cutter knives, comprising spaced pairs of rotatable superposed rollers, the rollers of each pair being of relatively different sizes, and the speeds of travel of the peripheries of said rollers being the same.

35. In a machine for cutting green corn from the cob, cutter knives, feeding elements for feeding the ears through said cutter knives, said elements comprising rotatable rollers of relatively different sizes, the speeds of travel of the peripheries of said rollers being the same.

36. In a machine for cutting green corn from the cob, cutter elements, means securing said elements together, and means for varying the effective length of said first means to vary the relative positions of said elements.

37. In a machine for cutting green corn from the cob, cutter elements, and a resiliently restrained means for securing said elements together, said means adjustable as to length to vary the relative position of said elements.

38. In a machine for cutting green corn from the cob, cutter elements, a resiliently restrained means securing said elements together, said means comprising means individually effective to vary the position of one of said elements with the remainder.

39. In a machine for cutting green corn from the cob, pivotally mounted cutter elements, and means securing said elements together so that they move together at all times.

40. In a machine for cutting green corn from the cob, pivotally mounted cutter elements, and means securing said elements together, said means adjustable to vary the relative position of said elements.

In testimony whereof I hereby affix my signature.

WILLIAM B. FENN.